United States Patent [19]

Rothe et al.

[11] Patent Number: 4,573,495

[45] Date of Patent: Mar. 4, 1986

[54] HYDROSTATIC BALLCOCK ASSEMBLY

[76] Inventors: Charles T. Rothe, Locust St., Providence, Ky. 42450; Larry D. Gish, Rte. 2, Box 150A, Robards, Ky. 42452

[21] Appl. No.: 673,980

[22] Filed: Nov. 21, 1984

[51] Int. Cl.<sup>4</sup> .................. F16K 31/34; F16K 33/00
[52] U.S. Cl. .................. 137/414; 137/426; 137/432; 137/448; 137/437; 251/46
[58] Field of Search ............. 137/414, 426, 432, 448, 137/437; 251/45, 46

[56] References Cited

U.S. PATENT DOCUMENTS

| | | | |
|---|---|---|---|
| 3,135,287 | 6/1964 | Kepka et al. | 137/414 |
| 3,194,258 | 7/1965 | Grant | 137/414 |
| 3,285,277 | 11/1966 | Goldtrap | 251/45 |
| 3,554,219 | 1/1971 | Hudson | 137/432 |
| 3,727,243 | 4/1973 | Biniores | 137/432 |
| 3,729,017 | 4/1973 | Brandelli | 137/414 |
| 4,186,765 | 2/1980 | Anderson | 137/414 |

Primary Examiner—G. L. Walton
Attorney, Agent, or Firm—Stephenson and Boller

[57] ABSTRACT

A ballcock assembly having an upright standpipe for delivery of flush water, a control valve assembly at the upper end of the standpipe, and a float and ballast assembly slidably mounted for up and down movement relative to the standpipe and connected to the control valve assembly. The control valve assembly operates to open the valve to flow of flush water from the standpipe assembly in response to downward movement of the float and ballast assembly. When the float assembly is caused to rise by incoming flush water from the standpipe, it ultimately causes the control valve to shut off incoming flow of flush water from the standpipe.

10 Claims, 5 Drawing Figures

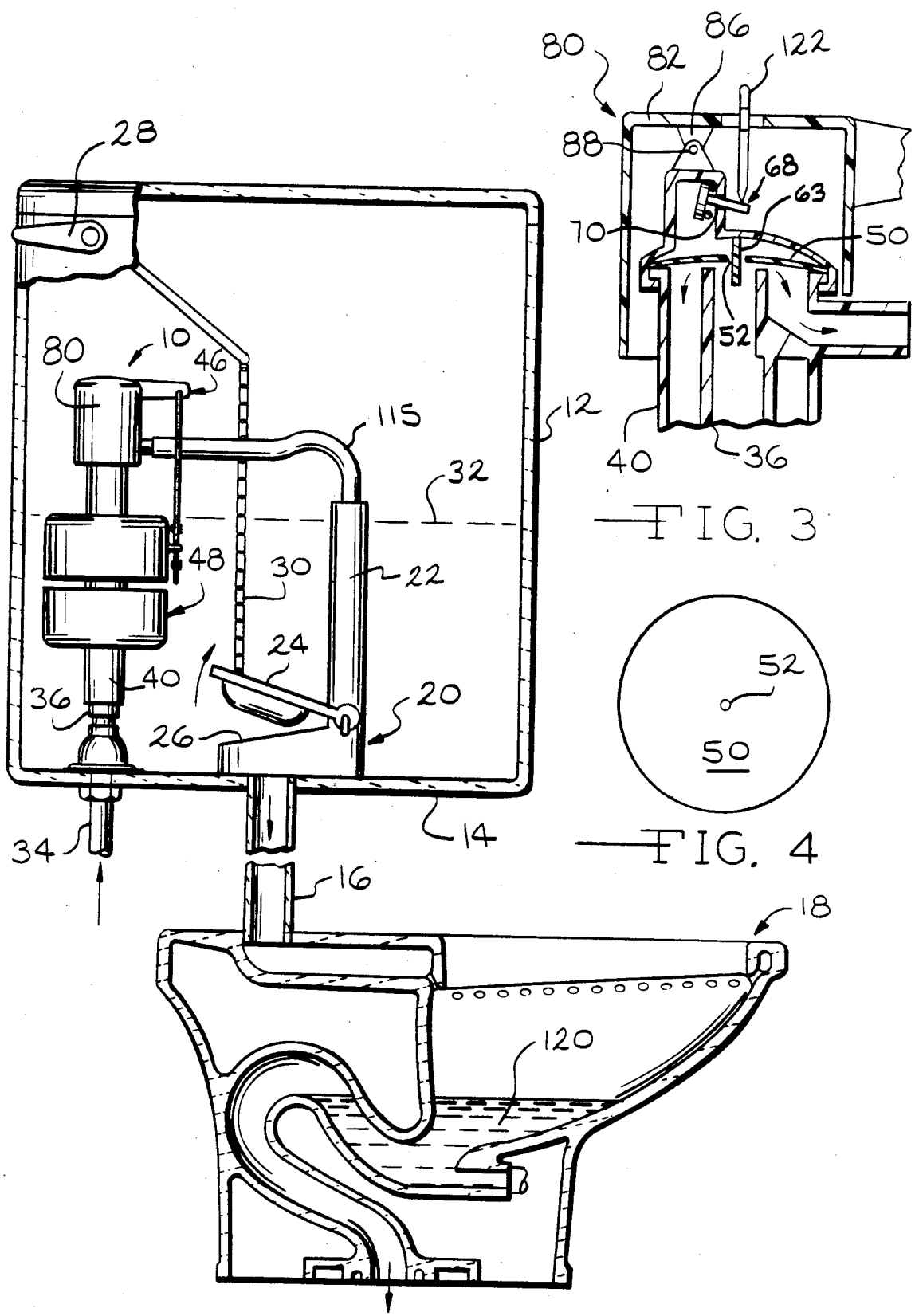

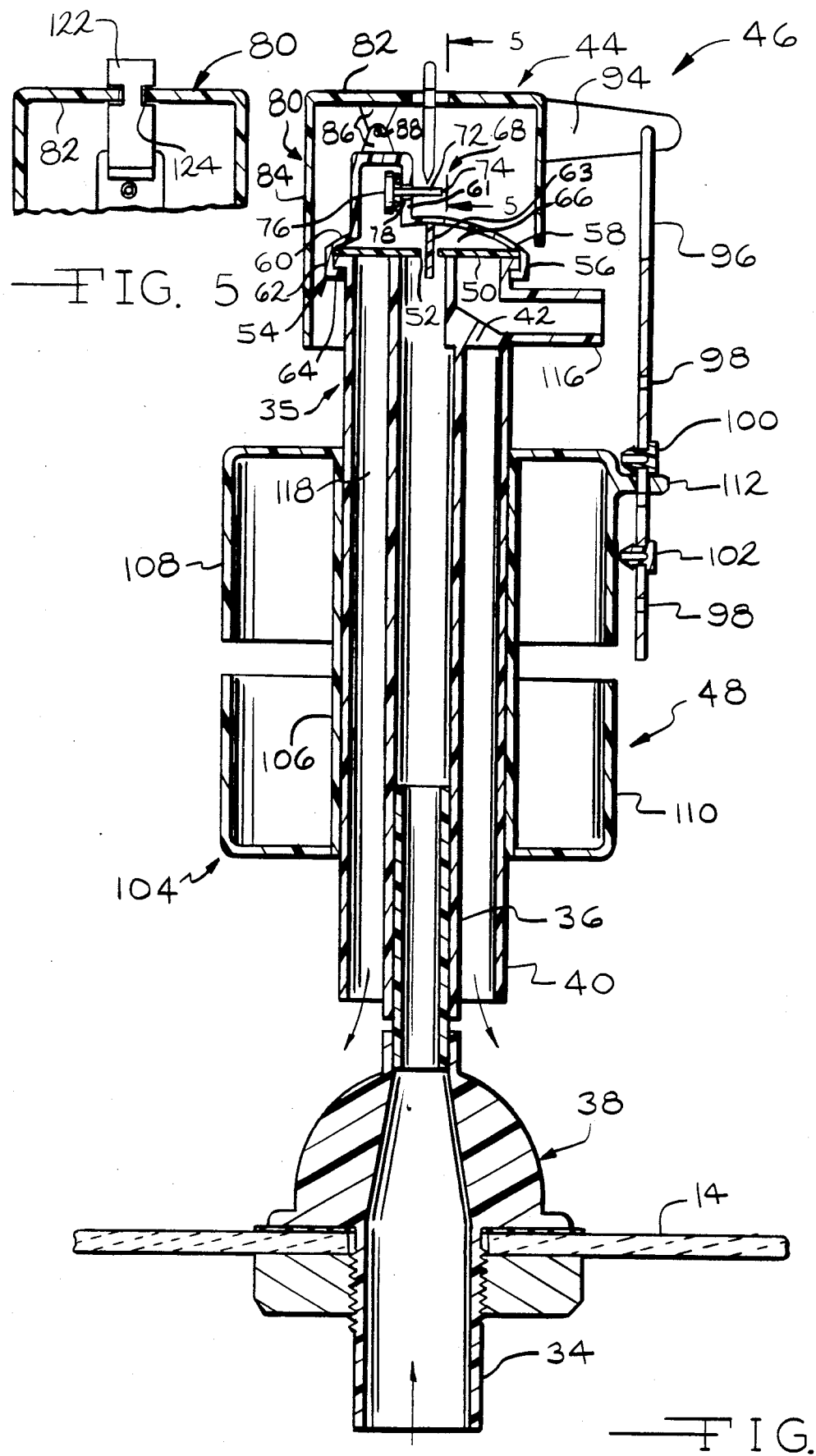

HYDROSTATIC BALLCOCK ASSEMBLY

BACKGROUND OF THE INVENTION

The invention relates generally to ballcock assemblies and more particularly to an improved ballcock assembly of the pivot valve type in which a high level of turbulence and a high volume water throughput between chambers in the valve is utilized to prevent the operation of the ballcock assembly from being adversely affected by foreign particles in the water. Also, a unique design and position of the pilot valve vent pin is utilized to control the opening and closing of the pilot valve.

Ballcock assemblies that have been commonly used in the past have been objectionable from the standpoint of noise, excessive water requirements for flushing, fouling due to clogging caused by foreign particles, lack of adjustability features, flooding should the float system malfunction, and short service lives. It is an object of the present invention to provide an improved ballcock assembly that overcomes these objectionable features of the ballcock assemblies used in the past.

SUMMARY OF THE INVENTION

The ballcock assembly of this invention includes an upright standpipe delivering flush water, the standpipe having an upper discharge end, and a discharge tube which is larger in diameter than the standpipe and is positioned so that it surrounds the standpipe and forms a water discharge passage for flush water entering the tank through the standpipe.

A control valve assembly for controlling the flow of water from the standpipe is mounted on the upper end of the standpipe and includes a housing which supports a diaphragm valve member that, in one position, closes the upper end of the standpipe. The valve assembly has a cover member that cooperates with the diaphragm member to form a vent chamber above the standpipe discharge end that communicates with water from the standpipe through a central port in the diaphragm valve member. This port enables incoming water in the standpipe to flow through the diaphragm valve member into the vent chamber.

The upper wall of the vent chamber has an opening and a vent valve member is provided in the chamber for opening and closing the opening. The vent valve member has a stem which extends through the vent opening and a seat which is located in the vent chamber and is engageable with the vent chamber wall to close the vent opening. In the absence of external forces on the vent valve stem, water forces from the standpipe will keep the vent valve member closed.

A vent water deflector member is hingedly mounted on the top wall of the valve housing. An actuator member on the deflector is engageable with the valve stem so as to exert a downward force on the stem which will move the vent valve to an open position allowing water in the vent chamber to escape through the vent opening, thereby creating unbalanced forces on the diaphragm member causing the diaphragm member to flex upwardly and communicate the upper end of the standpipe with the upper end of the discharge tube. Flush water can then flow at full volume out of the standpipe.

A float and ballast assembly is slidably mounted on the discharge pipe for up and down movement with the water level in the tank in which the standpipe is mounted. The assembly is adjustably connected to the deflector member so that when the water level in the tank has fallen to a predetermined level in response to flushing of the toilet associated with the tank, the weight of the assembly will apply a mechanical force to the stem of the vent valve tending to cock the vent valve and open the vent opening. Conversely, the float and the ballast assembly will operate in reverse, when the water in the tank has risen to an adjustable level, to lift the actuator member high enough to clear the vent valve stem, then the vent valve is closed by water pressure in the vent valve chamber.

The result is a ballcock assembly which is improved by virtue of the characteristics listed above and which provides for a non-restructed (full open) flow of water into the tank from the beginning of the refill cycle to the end of the refill cycle, the opening and closing of the valve being independent of line pressure. This greatly reduces the traditional noise problems associated with ballcock assemblies. Further the float and ballast assembly is adjustably connected to the pilot valve so that the upper water level in the flush tank can be controlled and the water level at which the ballcock valve is opened to incoming water can be controlled. A fail-safe feature is incorporated into the design to eliminate the possibility of an open water flow when a float/ballast system failure takes place. On float/ballast failure the vent deflector will disengage the activator from the stem; this in turn allows the vent valve to seat resulting in waterflow turn-off.

Further objects, features and advantages of this invention will become apparent from a consideration of the following description when taken in connection with the appended claims and the accompanying drawing in which:

FIG. 1 is a somewhat diagrammatic side view of a toilet and associated flush tank assembly which embodies the improved ballcock assembly of this invention, some parts being broken away and other parts being shown in section for the purpose of clarity;

FIG. 2 is an enlarged vertical sectional view of the ballcock assembly of this invention, showing the pilot valve in a shut-off position;

FIG. 3 is an enlarged fragmentary sectional view of a portion of the ballcock assembly of this invention showing the pilot valve in an open position in which flush water flows out of the standpipe;

FIG. 4 is a top view of the diaphragm member in the ballcock assembly of this invention; and FIG. 5 is a detailed sectional view of a portion of the ballcock assembly as seen from substantially the line 5—5 in FIG. 2.

With reference to the drawing, the ballcock assembly of this invention, indicated generally at 10, is illustrated in FIG. 1 mounted in a tank 12 having a bottom wall 14 and connected to a conventional flush toilet 18 by a flush valve assembly 20, of conventional construction, mounted in the tank 12. The flush valve assembly 20 includes a refill pipe 22 and a conventional flapper valve 24 movable between the open position shown in FIG. 1 and a closed position on a valve seat 26 and communicate with the flush toilet 18 by passageway 16. A conventional flush tank handle 28 on the tank 12 is connected by a chain 30 to the flapper valve 24.

In a typical operation of the ballcock assembly 10 and the flush assembly 20 to supply flush water to the toilet 18, assume that the water level in the tank 12 is as shown at 32 in FIG. 1, and that the flush handle 28 has been rotated to lift the flapper valve 24 to its open position shown in FIG. 1 so that water in the tank 12 will flow out of the tank through passageway 16 and into the toilet 18 for flushing purposes. When the water level 32 has dropped to a low point in the tank at which the flapper valve 24 is no longer buoyant, it swings downwardly under the action of gravity to a closed position against the seat 26 shutting off the flow of water from the tank 12 to the toilet bowl 18. The water level in the tank 12 will then gradually rise, since water will be entering the tank through an inlet line 34, until the water level reaches the level 32 at which time the ballcock assembly 10 functions to shut off the flow of incoming water.

The details of the ballcock assembly 10 are illustrated in FIGS. 2, 3 and 4. The ballcock assembly 10 includes a standpipe and discharge pipe assembly 35 consisting of concentric pipes 36 and 40. The upright adjustable length standpipe 36 is secured by a conventional connector assembly 38 to the tank bottom wall 14 so as to be in a fluid tight relation with the bottom wall 14. The discharge pipe 40 of larger diameter than the standpipe 36 surrounds the standpipe 36 and is maintained in a radially spaced relation with the standpipe by a series of radially extended webs 42 only one of which is shown.

A pilot valve assembly 44 is mounted on the upper ends of the pipes 36 and 40 and connected by connector assembly 46 to a float and ballast assembly 48 that is slidably mounted for up and down movement on the discharge pipe 40.

The pilot valve assembly 44 includes a main diaphragm type valve member 50, of disk-shape and formed of a flexible polyurethane, or equivalent material, having an axially disposed opening 52 extending therethrough. The diaphgram valve member 50 is mounted in what amounts to a housing 54 having a bottom wall 56 formed by a flange on the upper end of the discharge pipe and standpipe assembly 35. The housing 54 also includes a cover 58 having a top wall 60 and a depending side wall 62 which terminates in inwardly directed flange portions 64 that are releasably locked to the bottom wall 56 so as to clamp the circumferential edge of the diaphragm valve member 50 between the bottom wall 56 and the top wall 60 of the housing 54.

A depending pin 63 mounted on the top wall 60 projects downwardly through the opening 52 in a spaced relation with the diaphgram 50. When the diaphragm 50 flexes up and down between the positions shown in FIGS. 2 and 3, it moves up and down along the pin 63 which thus dislodges any particles trapped in the opening 52.

The diaphragm valve member 50 and the housing top wall 60 cooperate to form therebetween a vent valve chamber 66 in which a vent valve member 68 is located for opening and closing a discharge port or vent opening 70 in the housing top wall 60 located in an upright side portion 61 of the top wall 60.

The vent valve 68 includes a stem 72 having an outer end 74 and secured at its inner end to a disk-shape seat 76. An annular seal 78 forms part of the seat 76. The seal 78 is of a diameter to engage the housing top wall 60 at a position surrounding the discharge port 70 so as to shut off any flow of water from the chamber 66 through the opening 70.

A deflector member 80 of generally inverted cup-shape having a top wall 82 and a depending side wall 84 of annular shape is hingedly mounted on the housing top wall 60. Overlapping ears 86 formed on the housing top wall 60 and the deflector top wall 82 are connected by a transverse pin 88 to form the hinge connection enabling the deflector member 80 to be hinged up and down about the pin 88 relative to the valve housing 54.

An outwardly extending projection 94 on the deflector 80 is pivotally connected at its outermost end to one end of a downwardly extending link 96 which is formed near its bottom end with a plurality of vertically spaced openings 98 in which stop members 100 and 102 can be removably positioned.

The float and ballast assembly 48 consists of a body 104 having a central tubular portion 106 which is slidable up and down on the discharge tube 40 and which forms part of an upper float 108 of inverted cup shape which is partially filled with air and thus buoyant in the water in the tank 12 and a lower cup shape portion 110 which fills with water and constitutes ballast tending to move the assembly 48 downwardly on the discharge tube 40.

In the operation of the ballcock assembly 10, assume that the water level is at the level indicated at 32 in FIG. 1 and that the handle 28 has not yet been actuated to open the flapper valve 24. At this time, the pilot valve chamber 66 is filled with water at line pressure which has moved the vent valve 68 to a position closing the vent opening 70. Also, since the area on the top side of the diaphragm valve member 50 is greater than the area on the bottom side that is exposed to water at line pressure, namely, the area engaged with the open upper end of the standpipe 36, the water pressure force on the top side of the valve member 50 exceeds the force on the underside, so that the diaphragm valve member 50 is held in its closed position shown in FIG. 2.

Now assume that the handle 28 has been actuated to lift the flapper valve 24 so that the water level 32 drops below the float 108 so that the float drops downwardly to a position in which a projection 112 on the float 108 that slides up and down on the link 96 engages the lower stop member 102. The float and ballast assembly 48 then applies a downwardly directed force to the link 96 which is transmitted through projection 94 to the deflector member 80 so as to move the deflector member 80 in a clockwise direction about the pin 88. An actuator member 122 adjustably mounted in a slot 124 in the deflector top wall 82 is then moved downward into engagement with the vent valve stem 72 to apply a downwardly directed force to the stem 72 which tips the vent valve member 68, as shown in FIG. 3, so as to open the vent valve and allow flow of water from the chamber 66 through the vent opening 70. This water splashes against the deflector sidewall 84 and runs down the deflector sidewall 84 into the tank 12.

The release of water from the pilot valve chamber 66 reduces the force on the top of the diaphragm valve member 50 to a force less than the force on the bottom side so that the diaphragm valve member 50 is deflected upwardly to its full open position shown in FIG. 3. In this position of the valve member 50, incoming water in the standpipe 36 can flow into the tank 12 through the discharge tube 40 and into a supply tube 115 for the re-fill pipe 22 in the flush valve assembly 20 through a side passage 116 which communicates with the main discharge passage 118 formed between the discharge tube 40 and the standpipe 36. Water flowing through the passage 118 replaces the water flowing from the tank 12 into the toilet 18 for flushing purposes. Water flowing through passage 116 replaces the toilet bowl water 120 for flushing purposes. Water continues to flow through the port 52 in the diaphragm valve member into the chamber 66 and out of the port 70, the actuator 112 continuing to maintain the vent valve 68 in the open position shown in FIG. 3.

It can thus be seen that the diaphragm valve member 50 is moved from the closed position shown in FIG. 2 to the fully open position shown in FIG. 3 substantially instantaneously so that there is no gradual opening of the valve and when the valve is open, the flow of water from the standpipe 36 to the tank 12 is unrestricted so that water noise is greatly reduced.

When the water level in the tank 12 has reached a low level at which the flapper valve 24 is no longer buoyant, it closes so that no more water will flow from this tank through the passage 16. The water level 32 in the tank 12 then starts to rise so that the float 108 again becomes buoyant, moving the projection 112 upwardly off the lower stop 102. The water level continues to rise until the projection 112 strikes the upper stop 100 lifting the link 96 and moving the deflector 80 in a counterclockwise direction about the pin 88 to in turn lift the part 122 to a position in a clearance relation with the vent valve stem 72. The force of supply line water entering the vent valve chamber 66 now returns the vent valve seat 76 to its closed position illustrated in FIG. 2 in which no water can flow out of the valve chamber 66 through the opening 70. The pressure of water on the top side of the valve member 50 then immediately increases so that the total force on the top side of the valve member 50 causes an instantaneous return of the valve member 50 to its closed position shown in FIG. 2 This results in an immediate shutoff of water flowing through the ballcock assembly 10. The system is then in condition for the next flush.

The hydrostatic action in the area of the pilot valve opening 52, namely, high turbulence and high flow volumes combined with the cleaning action of pin 63, keeps the opening 52 free of foreign matter. The instantaneous full open and full close action of valve member 50 prevents noise and the simple structure of the valve member 60 insures a long service life for the ballcock assembly 10. The positive mechanical force on the vent valve 68 insures opening thereof when the tank is flushed, and the positive water force on the seat 76 provides a fail safe feature should the float assembly 48 become disengaged from link 96. The adjustable stops 100 and 102 enable adjustments of the ballcock assembly to conform to each installation so that flush water will not be wasted. The position of the actuator 122 on the deflector 80 is readily adjustable by sliding it horizontally in the slot 124. The position of the actuator 122 determines the magnitude of the force on the assembly 46 required to open the vent valve 68. Thus, adjustable actuator 122 provides for easy adjustment of the on/off of water flow into discharge pipe 40. In other words, a shift to the right of the actuator 122 in slot 124 increases the magnitude of the opening force applied to the vent valve stem 72 by the actuator 122 for each increment of downward movement of float assembly 48.

What is claimed is:

1. In a ballcock assembly having an upright standpipe for delivering flush water, said standpipe having an upper discharge end, a control valve assembly for controlling the flow of water from the standpipe, said control valve assembly comprising a housing having an annular bottom wall which extends about said standpipe upper end and a top wall having a water discharge opening, a diaphragm valve member supported at its radially outer edge on said housing bottom wall, said valve member cooperating with said housing top wall to form a vent valve chamber therebetween in said housing, said valve member having an opening therein enabling water to flow into said vent valve chamber from said standpipe, a vent valve member in said chamber movable between a closed position closing said top wall water discharge opening and an open position enabling flow of water out of said chamber through said discharge opening, said vent valve member comprising a seat located in said valve chamber and a stem extending outwardly through said opening in said housing top wall, actuator means movably mounted on said housing in a spaced relation with said vent valve member and engageable with said stem, a portion of said actuator means being adjustable at various points along the length of said stem to vary the magnitude of the valve opening force applied to said stem when said vent valve member is moved to an open position, and float means operatively associated with said vent valve member and operable to provide for movement of said actuator means on said housing into engagement with said stem to move said vent valve member from closed to open position, said vent valve member operating in the closed position to provide for movement of said diaphragm member to a position closing the discharge end of said standpipe and in the open position to provide for movement of said diaphragm member to a position opening the discharge end of said standpipe.

2. A ballcock assembly according to claim 1 wherein said actuator means movably mounted on said housing includes an inverted cup shape deflector member positioned above and extending downwardly over said valve housing and further including means connected to and extending between said deflector member and said float means providing for movement of said deflector member to a position in which an actuator member adjustably mounted thereon will engage said valve stem and move said vent valve member to the open position in response to downward movement of said float means.

3. A ballcock assembly according to claim 2 wherein said means connected to and extending between said deflector member and said float means includes a transversely extending projection on said float means, a downwardly extending link extending through said projection, and stop members mounted on said link on opposite sides of said projection.

4. A ballcock assembly according to claim 3 wherein said stop members are removably mounted on said link and are movable between a variety of alternate positions spaced lengthwise of said link to thereby enable adjustment of the vertical positions of said float means at which said float means operates to provide for movement of said deflector into and out of engagement with said valve stem.

5. In a ballcock assembly which includes an upright standpipe for delivering flush water, wherein said standpipe has an upper discharge end; a diaphragm valve member at said upper end of said standpipe, said valve member being movable between a closed position engaged with said standpipe upper end and a fully open position spaced above said standpipe upper end so as not to restrict the flow of water therefrom, vent valve means operatively associated with said diaphragm valve member and float means operatively associated with said standpipe for movement up and down between predetermined upper and lower positions in response to falling and rising water levels adjacent said standpipe, and means operatively associated with and extending between said vent valve means and said float means providing for movement of said diaphragm valve member to the full open position in response to movement of said float means to said lower position and for movement of said diaphragm valve member to said closed position in response to movement of said float member to said upper position, said vent valve means including a housing with a vent opening, a valve member in said housing and a valve stem extending outwardly through said vent opening into a space adjacent said housing, actuator means movably mounted on said housing for actuating said vent valve means to provide for movement of said diaphragm valve member between said open and closed positions, said actuator means including an adjustably mounted actuator member engageable with said stem at various points along the length thereof to vary the magnitude of the valve opening force applied to said stem when said vent valve means is moved to an open position, and means operatively connecting said actuator means and said float means to provide for movement of said actuator means in response to up and down movement of said float means.

6. A ballcock assembly according to claim 5 wherein said actuator means is adjustably mounted on said housing to enable adjustment of the magnitude of the force transmitted to said vent valve for each increment of movement of said float means.

7. A ballcock assembly according to claim 4 wherein said means connected to and extended between said actuator means and said float means is adjustably connected to said float means to thereby enable adjustment of said upper and lower positions of said float means.

8. For use in a ballcock assembly, a valve assembly comprising a disc shape diaphragm valve member having an underside and a top side and an axial opening, a valve housing holding the circumferential outer edge of said valve member in a fixed position in which a central portion of the valve member can flex upwardly in response to an upwardly directed force on the underside thereof exceeding any downwardly directed force on the topside thereof and can flex downwardly in response to a downwardly directed force on the topside exceeding any upwardly directed force on the underside, said valve housing including top wall structure cooperating with said diaphragm member to form a water chamber between said diaphragm member and said top wall member, means forming a water discharge opening for said chamber in said top wall member, and a vent valve member in said chamber operable to close said discharge opening, said vent valve member including a stem extending substantially horizontally through said discharge opening and a seat disposed in said chamber and including an annular seal surrounding said stem and engageable with said top wall structure at a position surrounding said discharge opening so as to close said vent valve, a water deflector member of generally inverted cup shape hingedly mounted on said top wall at a position such that a portion of the deflector wall is above said discharge opening, and a downwardly extending actuator member adjustably mounted on said deflector wall and engageable with said stem in response to hinged movement of said deflector member so as to apply an adjustable force to tip the vent valve member so as to open said discharge opening.

9. A valve assembly according to claim 8 wherein said actuator member is slidably mounted on said deflector member wall so as to be adjustably movable thereon in a substantially horizontal direction.

10. A valve assembly according to claim 8 further including pin means on said housing top wall projecting downwardly and extending through said axial opening in a spaced relation with said diaphragm valve member so that during said flexing said diaphragm valve member moves along said pin means which thereby functions to maintain said opening free of foreign particles.

* * * * *